United States Patent [19]

Mushovic

[11] 4,312,444
[45] Jan. 26, 1982

[54] CONVEYOR ROLLER

[76] Inventor: John N. Mushovic, 516 Salt Lick Trace, Peachtree, Ga. 30269

[21] Appl. No.: 84,459

[22] Filed: Oct. 12, 1979

[51] Int. Cl.³ .......................................... B65G 39/06
[52] U.S. Cl. .................................. 198/780; 29/121.4; 29/132; 83/436; 193/37
[58] Field of Search ............... 198/780, 785, 806, 842; 193/37, 35 C; 29/121.4, 128, 132; 83/156, 436

[56] References Cited

U.S. PATENT DOCUMENTS

| | | |
|---|---|---|
| 1,447,648 | 3/1923 | Devlin . |
| 2,317,742 | 4/1943 | Donbeck et al. . |
| 2,761,547 | 9/1956 | Gehrer . |
| 2,997,406 | 8/1961 | Freeman et al. ................... 29/132 X |
| 3,054,163 | 9/1962 | Lakin . |
| 3,210,825 | 10/1965 | Johnston ............................ 29/121.4 |
| 3,451,112 | 6/1969 | Karmell et al. . |
| 3,646,651 | 3/1972 | McGaughey et al. . |
| 4,015,320 | 4/1977 | Meckel et al. . |

FOREIGN PATENT DOCUMENTS 52-25389  2/1977  Japan ..................................... 198/780

*Primary Examiner*—Jeffrey V. Nase
*Attorney, Agent, or Firm*—Lane, Aitken, Kice & Kananen

[57] ABSTRACT

A conveyor roller having a low noise level and a long wear life consisting of a steel shaft, an intermediate layer made of a polymeric material (e.g., fiberglass-reinforced polyester) bonded to the shaft, a helical steel spring wear element situated around the periphery of the intermediate layer, and an outer layer made of an abrasion-resistant polymeric material bonded to the intermediate layer and the wear element. This roller solves the problem of high noise levels in steel plants, yet also exhibits long wear life.

36 Claims, 6 Drawing Figures

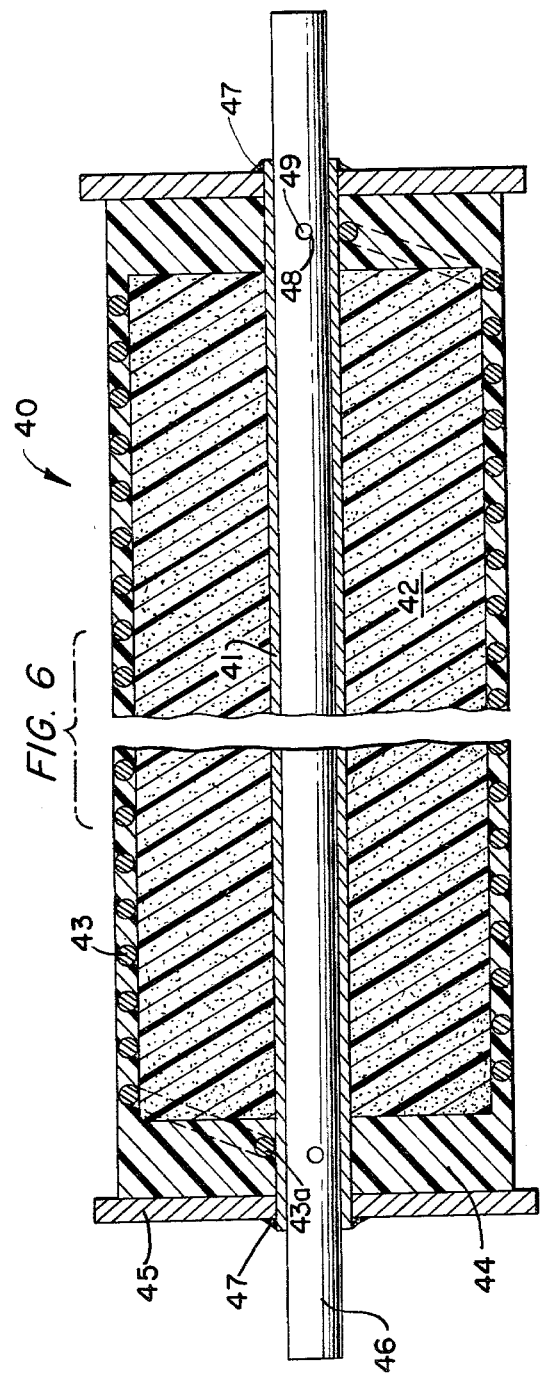

CONVEYOR ROLLER

BACKGROUND OF THE INVENTION

1. Field of the Invention

This invention relates to the design and fabrication of conveyor rollers, and more particularly to conveyor rollers having reduced noise levels and long wear life.

2. Description of the Prior Art

The art of conveyor rollers is well-developed. The following representative patents define the state of the art prior to the present invention.

U.S. Pat. No. 2,317,742 granted to Donbeck et al described a conveyor roller for use in steel mills having a case-hardened, polished steel body giving high resistance to wear while shielding the transported medium from scratching or marring.

U.S. Pat. No. 2,761,547 granted to Gehrer described a conveyor or feed roller having a plurality of identical annular roller elements consisting of inner and outer annular members made of steel and intermediate annular members made of rubber. Gehrer's roller was designed to accommodate work pieces of widely varying sizes.

U.S. Pat. No. 3,054,163 granted to Lakin described a roller consisting of a plurality of discs made of fabric-reinforced, resilient rubber (such as tire casings) mounted on a shaft and anchored by metal discs between the rubber discs to prevent displacement of the flexible discs.

U.S. Pat. No. 3,451,112 granted to Karmell et al described a rubber covered steel mill roller with a steel core having a finished protective coating of hard acid-resistant fibrous glass reinforced polyester resin and an outer cover consisting of a performed fibrous glass reinforced resin lined rubber sleeve.

U.S. Pat. No. 3,646,651 granted to McGaughey et al described a conveyor roller for use in corrosive environments consisting of a hollow tubular core structure, a corrosion-resistant resin layer adhered to the core structure, a layer of fiberglass material adhered to the resin layer, an additional layer of resin material impregnating and covering the fiberglass material, another layer of a mat formed from at least one of the group consisting of fibrous crocidilite, asbestos, and polyvinyl chloride-acrylonitrile copolymer covering the second resin layer, and another layer of the resin material impregnating and covering the second mat layer. This roller was designed for use in conditions typified by varying abrasive conditions, elevated temperatures, or any type of chemically corrosive conditions such as relatively high or relatively low pH environments.

U.S. Pat. No. 4,015,320 granted to Meckel et al described a roller for the pressure treatment of webs of goods having a rigid roller core and hose-shaped roller mantle of rubber with reinforcing inserts, in which the reinforcing inserts include a steel wire coil wound concentrically and steel wire layers which are arranged parallel to each other and extend in the axial direction. The Meckel et al roller was designed to eliminate undesired deformation of the elastomeric cover on rollers intended for the processing of paper or textile or for rotary printing machines which are subjected to various forces, primarily radially directed pressure and pushing or sheering forces originating from frictional contact.

Other roller constructions are described in U.S. Pat. No. 1,447,648 granted to Deulin, U.S. Pat. No. 2,253,141 granted to Schofield, U.S. Pat. No. 3,401,439 granted to Staats et al, and U.S. Pat. No. 3,577,315 granted to Franklin.

SUMMARY OF THE INVENTION

The present invention is a conveyor roller which reduces noise levels and has a long wear life and a method of making the conveyor roller.

Prior to this invention, shear lines for steel reinforcing bar (rebar) experienced noise levels in excess of limits allowed by the Occupational Safety and Health Administration (OSHA). Replacing the steel conveyor rollers in such shear lines with plastic, polypropylene, polyethylene, or polyurethane rollers results in noise reduction to allowable levels. However, such rollers wear very quickly under the abrasive conditions, are subject to selective gouging, and need to be replaced frequently. This decreases overall efficiency. Thus, utilization of plastic or conventionally-strengthened plastic compounds as conveyor rollers in rebar shear lines alleviates the noise problem, but such rollers are not economically feasible because of short wear life.

Analysis indicates that noise in conventional rebar shear lines originates from three sources: first, steel rebar rods striking the hollow steel conveyor rollers at 80–100 ft./min.; second, steel rebar rods striking the rollers and bouncing back to strike each other and compounding the noise; and third, steel rebar rods moving across metal conveyor supports. The contribution to overall noise level increases as the rollers wear down.

One steel rebar plant was given a deadline by OSHA to bring the noise level down to allowable limits. Efforts to reduce the noise level were focused on modification of the conveyor rollers. However, all past attempts using polyethylene, polypropylene, or urethane coated steel conveyor roller and wire brush rollers failed from premature wear. In addition to being high in cost, the polyurethane coated steel conveyor rollers and the wire brush rollers, with wires extending radially out from the axis, do not provide adequate resistance to wear and selective gouging.

The present invention solves these problems by providing a conveyor roller which reduces noise to allowable limits at a reasonable cost while at the same time providing long wear life and eliminating selective gouging.

The inventive conveyor roller includes a central shaft, an intermediate layer composed of a polymeric material bonded to the shaft, a hard wear element positioned around the periphery of the intermediate layer, and an outer layer composed of an abrasion-resistant polymeric material bonded to the intermediate layer and to the wear element. The inventive method of making the conveyor roller includes casting the intermediate layer on the central shaft, placing the wear element over the intermediate layer, and casting the outer layer on top of the intermediate layer.

BRIEF DESCRIPTION OF THE DRAWINGS

FIG. 6 is a longitudinal section through the axis of another version of the second embodiment of the inventive conveyor roller.

DESCRIPTION OF THE PREFERRED EMBODIMENT

Figure 1:
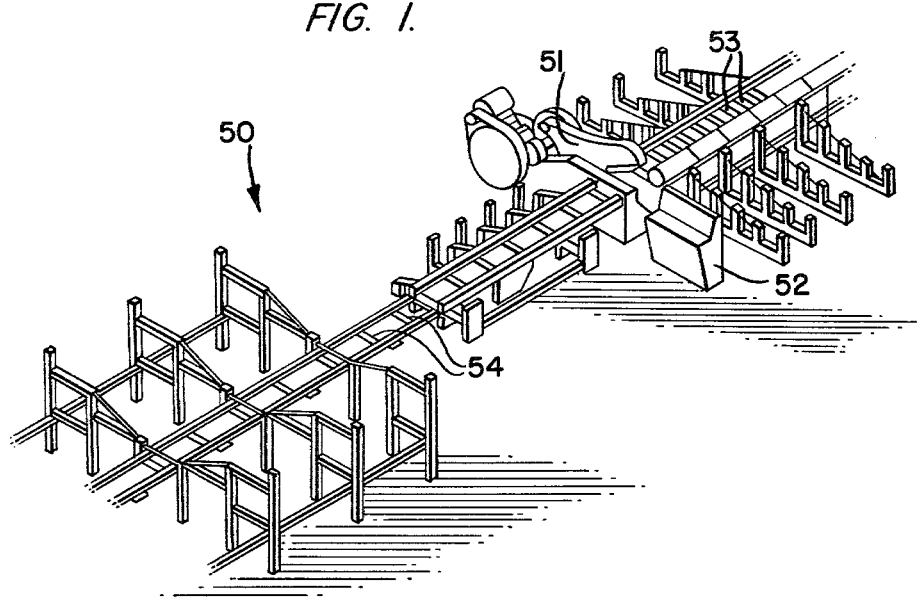
FIG. 1 is a perspective view of a shear line in which the inventive conveyor rollers may be advantageously used.

Referring to the drawings, FIG. 1 shows a shear line 50. Shear line 50 consists of an input conveyor having rollers 54, a shear 51, a control console 52, and an output conveyor having rollers 53. One commercially available shear line (sold under the trademark "Rebar-Matic") is an automatic system that loads, conveys, gauges, shears and discharges any size reinforcing bar from #3 to #18S. Such a shear line can handle bars up to sixty feet in length. Gaging is instantaneous and accurate to within ¼ of an inch increments with complete repeatability. Automatic discharging of sheared bars to either side of the gage table is accomplished by the operator from the control console.

The conveyor roller of the present invention can be used advantageously as rollers 54 of the input conveyor and as rollers 53 of the output conveyor in shear line 50. Two embodiments of the inventive conveyor roller will be described.

Figure 2:
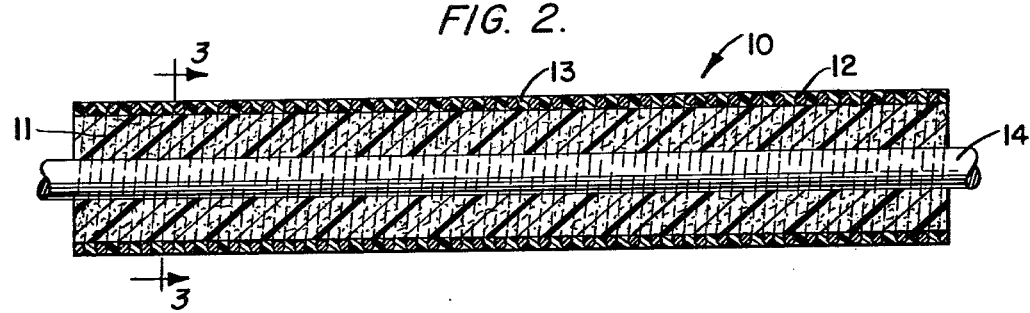
FIG. 2 is a longitudinal section through the axis of a first embodiment of the inventive conveyor roller.
Figure 3:
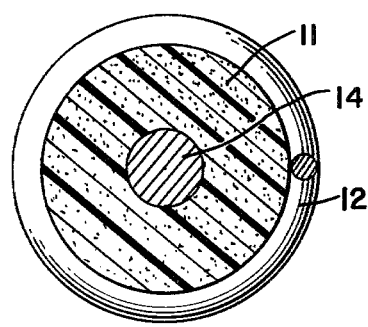
FIG. 3 is a cross-section along the line 3—3 shown in FIG. 2.

The First Embodiment
(FIGS. 2 and 3)

The first embodiment is shown in FIGS. 2 and 3. Roller 10 has a central shaft 14 preferably made of steel. Cylindrical intermediate layer 11 is bonded to shaft 14. Cylindrical outer layer 13 is bonded to layer 11 and to wear element 12. Typically, roller 10 is approximately five inches in diameter and two feet in length.

Intermediate layer 11 is made of a polymeric (thermoplastic or thermosetting) material. The term "thermoplastic" refers to synthetic resins that may be softened by heat, and then regain their original properties upon cooling. Polyvinyl, polystyrene, polyethylene, polypropylene, cellulose and acrylic resins are of this type. The term "thermosetting" refers to synthetic resins which solidify or set on heating and cannot be remelted. The thermosetting property is usually associated with a crosslinking reaction of the constituents to form a three dimensional network of polymer molecules. This type includes phenolic resins, alkyds, amino resins, polyesters, epoxies, polyurethanes, silicones. The term "polymeric material" also includes reinforced polymeric composite materials. The term "polymeric composite" refers to compositions of two or more materials, one of which is a high polymer and one of which is a reinforcing material. A polymeric composite has unique properties, such as strength and stiffness, which are superior to the individual components. Forms of reinforcement include fibers, woven cloth, nonwoven mats, or roving. Thus, reinforced thermoplastic resins and reinforced thermosetting resins are considered polymeric composites. Typical examples of polymeric composites are fiber-reinforced resins, such as glass and boron-reinforced epoxy and polyester resins and glass-reinforced thermoplastics.

Layer 11, made of a polymeric material, acts as a noise damper and as a support for the abrasion-resistant wear element 12 embedded in outer layer 13 which surrounds intermediate layer 11.

Outer layer 13 is also made of a polymeric (thermoplastic or thermosetting) material. It is preferred to make layer 13 from an elastomer. The term "elastomer" or "elastomeric" refers to a large class of synthetic thermosetting polymers which have rubber-like characteristics, i.e., they are elastic. Some examples of elastomers are: polyurethane, polyacrylate, styrene-butadiene, fluorocarbon, poly-butadiene, propylene oxide, neoprene, butyl, silicone, polyisoprene, polysulfide, nitrile, and ethylene-propylene rubbers. Polymeric outer layer 13 is abrasion-resistant (i.e., it resists wear and tear). It bonds to wear element 12 and intermediate layer 11. It encapsulates wear element 12, holding that element securely in place.

Wear element 12 is hard wearing (being superior in wear properties to outer layer 13) and is preferably in the shape of a ring, coil, or helix surrounding the periphery of layer 11. It can be made of any material which sufficiently resists abrasion and wear. For example, wear element 12 can be a steel spring with a wire diameter of 0.187 inches and a spacing of about ⅛ inch between turns in the helix. The spring steel may be untreated or it can be chromium plated or case hardened in order to give it a more highly abrasion-resistant surface. The helical configuration of wear element 12 is designed to minimize the side thrust of the work pieces (i.e., in directions at an angle to the line of movement) and to minimize selective gouging on the roller.

Intermediate layer 11 is cast on shaft 14 as the first step in production. Then wear element 12 is placed around the periphery of layer 11. In the final casting step, wear element 12 is encapsulated by outer layer 13, which is cast on top of intermediate layer 11. After this fabrication step, a thin film of polymeric material 13 covers the top of wear element 12. In what can be considered as the final fabrication step, this thin film is quickly worn away in use to expose the surface of wear element 12 to the work pieces, after which there is little additional wear of roller 10.

Accordingly, after the wearing away of this thin film, the roller of the invention has a wear element which is exposed on the cylindrical outer surface, whereas the roller of the invention, prior to any use, has the wear element cover by this thin film. Alternatively, the roller of the invention could be fabricated in such a way as to expose the wear element at the cylindrical outer surface prior to any use.

Roller 10 exhibits no resonance or propagation of noise because of the discontinuity of the wear surface (as contrasted to the conventional noise-generating wear surface).

EXAMPLE 1

A preferred embodiment of roller 10 is made as follows. Steel shaft 14 is centered in a cylindrical vertical mold (not shown). It is preferred to make intermediate layer 11 from a reinforced polymeric composite using a castable polyester resin. Suitable polyester resins are sold under the trademark "Paraplex" P resins (Rohm & Haas Co.), particularly product code nos. P-13 and P-43. These products are unsaturated polyesters that cure to a cross-linked structure. They are supplied as light-colored, 100%-reactive solutions dissolved in styrene.

The P-43 product produces a rigid resin when cured. The P-13 product produces a more flexible resin when cured. It is preferred to use a blend of the two products, for example, a blend of 50 percent by weight P-13 and 50 percent by weight P-43. Alternatively, the P-13 product can be as much as 70 percent by weight of the blend. Promoters and catalysts are used following the manufacturer's instructions. In order to speed the curing of the polyester, an accelerator, such as dimethylaniline (DMA), is used in an amount of 0.01–0.1 percent by weight.

Reinforcing fibers are added to the above blend of products in order to make the polymeric composite and to prevent cracks in the final cast polyester. For reinforcing fibers, 2–6 percent by weight may be milled fiberglass and 1–15 percent by weight may be chopped fiberglass. Experience has shown that if 6 percent by weight of the fiber glass is of the milled type, than a maximum of 10 percent by weight should be of the chopped type. However, if only 2 percent by weight of the milled type is employed, then 15 percent by weight of the chopped type may be used. These reinforcing fibers impart strength and impact resistance to the final polymeric composite forming intermediate layer 11.

A typical conveyor roller will need about seven pounds of the above resin and fiber mix to make layer 11. The mix is poured into the mold around shaft 14 and allowed to cure for approximately 10 minutes. The top and bottom of the mold are then opened and this subassembly is removed. The dimensions of layer 11 are checked and trimmed if necessary.

A steel spring (wear element 12) with an inside diameter approximately 0.01 inches larger than the outside diameter of cylindrical layer 11 is then slipped over the periphery of layer 11. Alternatively, a wire can be wrapped around layer 11 using a lathe at slow speed.

This sub-assembly consisting of shaft 14, layer 11, and wear element 12 is then placed in a second cylindrical vertical mold (not shown) for the casting of outer layer 13. It is preferred to make layer 13 out of a polyurethane rubber. The finished layer 13 should be relatively hard (in the range of Shore durometer A 90 to D 70, optimum being D 65), with high tear strength and good tensile strength. Suitable high performance polyurethane rubbers are commercially available under the following trademarks: "Adiprene" (E. I. duPont de Nemours & Co.), "Vibrathane" (Uniroyal, Inc.), or "Castathane" (The Upjohn Co.) (product no. NS 252-28-1NVM). These polyurethane rubbers have outstanding impact strength, load-bearing capacity and abrasion resistance which is superior to other elastomers.

Typically, the starting materials to make these polyurethane rubbers are sold in two components. The components are mixed together in order to initiate polymerization and then either poured into an open mold or injected into a closed mold. It is preferred to use injection casting. The two starting components may be metered, mixed, and dispensed from a machine where the components are separately mixed and heated under vacuum. The two components come together in a mixing head and are injected into the mold at 250 psi to form outer layer 13. Curing of layer 13 requires approximately 30 minutes in the mold. After demolding, a post cure of four hours at temperatures between 200° F. and 250° F. is required.

Conveyor rollers made according to the foregoing example have been successfully tested in a steel rebar plant. A decibel reduction of 12 was achieved, which was sufficient to meet OSHA noise limits. Preliminary indications are that this roller will achieve at least a one-year wear life.

Figure 4:
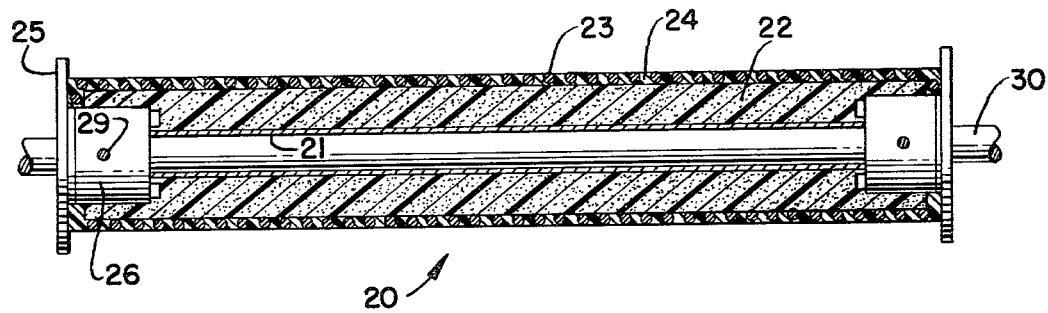
FIG. 4 is a longitudinal section through the axis of a second embodiment of the inventive conveyor roller.
Figure 5:
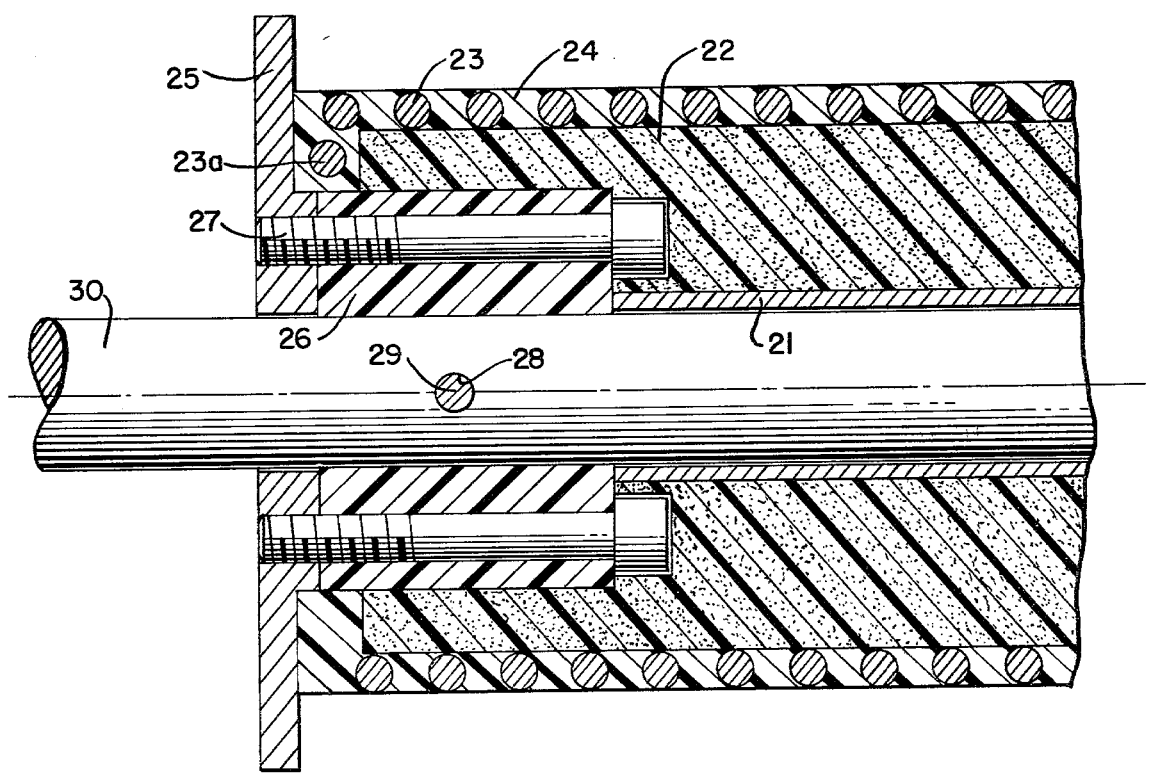
FIG. 5 is a longitudinal section at one end of the inventive conveyor roller shown in FIG. 4.

The Second Embodiment (FIGS. 4, 5 and 6)

A second embodiment of the inventive conveyor roller is shown in FIGS. 4, 5 and 6. This embodiment is a quick-disconnect version of the first embodiment. Referring to FIG. 4, roller 20 has a hollow central core 21 consisting of a length of metal tubing. Surrounding core 21 is intermediate layer 22 made of polymeric material. Around the periphery of layer 22 is wear element 23 which is encapsulated and held in place by outer layer 24 which is made of a polymeric material. At each end of roller 20 are end plates 25 having central apertures for receiving shaft 30 or hollow central core 21. Inward from end plates 25 are separate cylindrical members 26 which are made of polymeric material and which also have central apertures for receiving shaft 30 or hollow central core 21. Cylindrical members 26 are fitted into receiving cavities in intermediate layer 22. Driving lugs 29 pass through the entire roller and lock it onto shaft 30.

The details of this second embodiment are further illustrated in FIG. 5. Threaded bolts 27 engage end plate 25. Bolts 27 are encased in cylindrical member 26 made of polymeric material. Cylindrical member 26 is cast onto end plate 25 and around bolts 27 in a separate production step. The sub-assembly consisting of end plate 25, cylindrical block 26, and bolts 27 is then press fitted and adhesively bonded into a pre-formed receiving cavity in the end of layer 22. A preferred embodiment of roller 20 is made according to the following example.

EXAMPLE 2

A length of hollow tubing 21 (for example, 14 gauge steel tubing) is polished, then placed in a cylindrical vertical mold (not shown). Cylindrical mold ends are placed in each end of the vertical mold in order to form the receiving cavities in the ends of layer 22 which will later receive cylindrical members 26. The length of hollow tubing 21 is placed in a centered hole in the mold end which in turn centers it to the mold.

It is preferred to use a reinforced polymeric composite material (as described in Example 1) which is cast around tubing 21 to form cylindrical intermediate layer 22. This sub-assembly is then removed from the mold and the dimensions of layer 22 are checked. A steel spring, such as described in Example 1, is then slipped over the periphery of cylindrical layer 22 to form wear element 23. The ends of the wear element are bent toward the hollow tubing as shown at 23a in FIG. 5. This sub-assembly consisting of tubing 21, layer 22, and wear element 23 is then placed in a second cylindrical vertical mold (not shown) for the step of casting cylindrical outer layer 24. Following the preferred procedure outlined in Example 1, outer layer 24 is formed on top of layer 22 and wear element 23. This unit is then removed from the mold and the plugs are removed from tubing 21.

A separate sub-assembly is fabricated consisting of end plate 25, bolts 27, and cylindrical member 26. This subassembly is fabricated by threading bolts 27 into end plate 25 and placing a cylindrical plug in the aperture of end plate 25. A cylindrical mold is then placed around the periphery of end plate 25 and polymeric material is cast in the mold, surrounding bolts 27 and the cylindrical plug. After curing, the mold and the plug are removed, leaving cylindrical member 26 with a central aperture. Cylindrical member 26 is preferably made of the reinforced polymeric composite material described in detail in Example 1. The completed sub-assembly is press fitted in the pre-formed receiving cavities in the ends of layer 22 and adhesively bonded.

Shaft 30 is inserted through tubing 21 and holes 28 are drilled through the entire roller and shaft 30. Driving lugs 29 are then placed in holes 28 to lock the roller to shaft 30.

EXAMPLE 3

FIG. 6 illustrates another, lower-cost version of the present invention. Roller 40 has hollow central core 41, such as a length of steel tubing. Surrounding core 41 is intermediate layer 42 made of polymeric material. It is preferred to use a reinforced polymeric composite material (as described in Example 1) which is cast around tubing 41 to form intermediate layer 42. This sub-assembly is then removed from the mold and the dimensions of layer 42 are checked and trimmed if necessary.

A steel spring, such as described in Example 1, is slipped over the periphery of cylindrical layer 42 to form wear element 43. It is preferred to bend the ends of spring 43 in toward tubing 41. The end of the spring may be welded to the tubing at point 43a in FIG. 6. This sub-assembly (tubing 41, layer 42, and wear element 43) is then placed in a second cylindrical vertical mold for the step of casting cylindrical outer layer 44. Using the preferred procedure described in Example 1, outer layer 44 is formed on top of layer 42 and wear element 43.

End plates 45 having centrally-located apertures are mounted on the ends of central core 41 and against the ends of layer 44. Approximately ⅛" of central core 41 extends beyond each end plate. The end plates are then welded to the central core 41. Shaft 46 is inserted in tubing 41 and holes 48 are drilled through the roller and shaft. Driving lugs 49 are then placed in the holes to lock the roller to the shaft.

The version shown in FIG. 6 has the advantage of eliminating the end plate-cylindrical member sub-assembly of the design shown in FIGS. 4 and 5 and the complex core mold used to make that design. Furthermore, the central core 41 and the intermediate layer 42 can be closely machined to control product quality. Thus, the roller of FIG. 6 can be produced with better quality control and at a lower cost.

The bearings for the conveyor rollers in shear line 50 (FIG. 1) are typically welded or bolted to the frame of the shear line. When a second embodiment roller eventually wears out, it can be quickly replaced by simply removing the driving lugs and slipping the shaft out through the bearings. A new roller is held in place and the shaft and the driving lugs are reinserted. Thus, an important advantage of the second embodiment is that it can be replaced without removing the bearings in the frame of the shear line. Of course, the second embodiment roller also has the advantages of significantly reduced noise levels and a long wear life.

When rollers of either the first or second embodiment are used in a rebar shear line, one should alternate rollers in the conveyor lines having right hand and left hand threaded wear elements in order to prevent the work pieces from tending to move to the right or left.

The above-described embodiments are intended to be illustrative, not restrictive. The full scope of the invention is defined by the claims, and any and all equivalents are intended to be embraced.

It is claimed:
1. A conveyor roller having a low noise level and a long wear life comprising:
   (1) a central shaft;
   (2) an intermediate layer composed of a polymeric material bonded to the shaft;
   (3) a hard wear element positioned around the periphery of the intermediate layer and having a predetermined thickness; and
   (4) an outer layer composed of an abrasion-resistant polymeric material bonded to the intermediate layer and to the wear element and having a thickness substantially equal to the thickness of the hard wear element, whereby the hard wear element produces a long wear life and the polymeric materials produce a low noise level.
2. The conveyor roller defined in claim 1, wherein the intermediate layer is composed of a thermoplastic polymeric material.
3. The conveyor roller defined in claim 1, wherein the intermediate layer is composed of a thermosetting polymeric material.
4. The conveyor roller defined in claim 1, wherein the intermediate layer is composed of a reinforced polymeric composite material.
5. The conveyor roller defined in claim 4, wherein the intermediate layer is composed of a castable polyester reinforced with fiberglass.
6. The conveyor roller defined in claim 5, wherein the intermediate layer is composed of a thermosetting polyester containing about 2–6% by weight milled fiberglass and about 1–15% by weight chopped fiberglass.
7. The conveyor roller defined in claim 1, wherein the wear element is a metal element positioned around the periphery of the intermediate layer.
8. The conveyor roller defined in claim 7, wherein the wear element is a helical steel spring.
9. The conveyor roller defined in claim 8, wherein the steel spring has a wire diameter of about 0.187 inches and a spacing of about ⅛ inch between turns in the helix.
10. The conveyor roller defined in claim 1, wherein the outer layer is composed of a thermoplastic polymeric material.
11. The conveyor roller defined in claim 1, wherein the outer layer is a thermosetting polymeric material.
12. The conveyor roller defined in claim 11, wherein the outer layer is composed of a high performance elastomer having high tear strength, good tensile strength, and being relatively hard.
13. The conveyor roller defined in claim 12, wherein the outer layer is composed of polyurethane rubber.
14. The conveyor roller defined in claim 13, wherein the outer layer is composed of polyurethane rubber having a hardness in the range of Shore durometer A 90 to D 70.
15. A quick disconnect conveyor roller having a low noise level and a long wear life comprising:
   (1) a central hollow core;
   (2) an intermediate layer composed of a polymeric material bonded to the central core;
   (3) a hard wear element positioned around the periphery of the intermediate core and having a predetermined thickness;

(4) an outer layer consisting of an abrasion-resistant polymeric material bonded to the intermediate core and to the wear element and having a thickness substantially equal to the thickness of the hard wear element, whereby the hard wear element produces a long wear life and the polymeric materials produce a low noise level; and (5) a pair of end plates having central apertures.

16. The conveyor roller defined in claim 15, wherein the central hollow core is a metal tube.

17. The conveyor roller defined in claim 15, wherein the intermediate layer is composed of a thermoplastic polymeric material.

18. The conveyor roller defined in claim 15, wherein the intermediate layer is composed of a thermosetting polymeric material.

19. The conveyor roller defined in claim 15, wherein the intermediate layer is composed of a reinforced polymeric composite material.

20. The conveyor roller defined in claim 15, wherein the intermediate layer is composed of a castable polyester reinforced with fiberglass.

21. The conveyor roller defined in claim 20, wherein the intermediate layer is composed of a thermosetting polyester containing about 2-6 percent by weight milled fiberglass and about 1-15 percent by weight chopped fiberglass.

22. The conveyor roller defined in claim 15, wherein the wear element is a metal element positioned around the periphery of the intermediate layer.

23. The conveyor roller defined in claim 22, wherein the wear element is a helical steel spring.

24. The conveyor roller defined in claim 23, wherein the steel spring has a wire diameter of about 0.187 inches and a spacing of about ⅛ inch between turns in the helix.

25. The conveyor roller defined in claim 22, wherein the outer layer is composed of a high performance elastomer having high tear strength, good tensile strength, and being relatively hard.

26. The conveyor roller defined in claim 25, wherein the outer layer is composed of polyurethane rubber.

27. The conveyor roller defined in claim 26, wherein the outer layer is composed of polyurethane rubber having a hardness in the range of Shore durometer A 90 to A 70.

28. The conveyor roller defined in claim 15, wherein the outer layer is composed of a thermoplastic polymeric material.

29. The conveyor roller defined in claim 15, wherein the outer layer is a thermosetting polymeric material.

30. The conveyor roller defined in claim 15, wherein the end plates are mounted on cylindrical members which are secured in receiving cavities formed in the intermediate layer.

31. The conveyor roller defined in claim 30, wherein the cylindrical members are composed of a polymeric material which encases bolts engaged to the end plates.

32. The conveyor roller defined in claim 15, wherein the end plates are mounted on and rigidly secured to the central hollow core.

33. The conveyor roller defined in claim 32, wherein the end plates are welded to the central hollow core.

34. The conveyor roller defined in claim 15, further comprising:
a shaft inserted through the central core; and
driving lugs passing through the central core and the shaft, whereby the central core is locked onto the shaft.

35. In a shear line including an input conveyor and an output conveyor, the improvement consisting of using in the input conveyor and in the output conveyor, conveyor rollers having a low noise level and a long wear life, said conveyor rollers comprising:

(1) a central shaft;

(2) an intermediate layer composed of a polymeric material bonded to the shaft;

(3) a hard wear element positioned around the periphery of the intermediate layer and having a predetermined thickness; and (4) an outer layer composed of an abrasion-resistant polymeric material bonded to the intermediate layer and to the wear element and having a thickness substantially equal to the thickness of the hard wear element, whereby the hard wear element produces a long wear life and the polymeric materials produce a low noise level.

36. In a shear line including an input conveyor and an output conveyor, the improvement consisting of using in the input conveyor and in the output conveyor, quick disconnect conveyor rollers having low noise level and a long wear life, said quick disconnect conveyor rollers comprising:

(1) a central hollow core;

(2) an intermediate layer composed of a polymeric material bonded to the central core;

(3) a hard wear element positioned around the periphery of the intermediate core and having a predetermined thickness;

(4) an outer layer consisting of an abrasion-resistant polymeric material bonded to the intermediate core and to the wear element and having a thickness substantially equal to the thickness of the hard wear element, whereby the hard wear element produces a long wear life and the polymeric materials produce a low noise level; and (5) a pair of end plates having central apertures.

* * * * *